(12) United States Patent
Baker, Jr.

(10) Patent No.: US 6,547,689 B2
(45) Date of Patent: Apr. 15, 2003

(54) ANGULAR MOTION TRANSLATOR

(76) Inventor: George Paul Baker, Jr., 1018 Laurel Av., Denham Springs, LA (US) 70726

( * ) Notice: Subject to any disclaimer, the term of this patent is extended or adjusted under 35 U.S.C. 154(b) by 34 days.

(21) Appl. No.: 09/798,435

(22) Filed: Mar. 2, 2001

(65) Prior Publication Data

US 2001/0036880 A1 Nov. 1, 2001

Related U.S. Application Data

(60) Provisional application No. 60/186,692, filed on Mar. 3, 2000.

(51) Int. Cl.[7] ................................................. F16H 1/28
(52) U.S. Cl. ........................... 475/331; 74/395; 74/640; 56/12.7; 172/13; 464/160; 242/564.1; 242/570; 30/276
(58) Field of Search .................................. 475/331–349, 475/6, 162, 330, 297, 296; 74/63–69, 840, 640, 395–403, 392; 73/862.31; 242/564.1, 597.4, 570; 172/13, 25, 41, 35; 396/48, 132, 418, 85; 56/12.7, 12.1; 30/276

(56) References Cited

U.S. PATENT DOCUMENTS

| | | | |
|---|---|---|---|
| 3,385,125 A | * | 5/1968 | Plumb |
| 4,183,138 A | | 1/1980 | Mitchell et al. |
| 4,209,902 A | | 7/1980 | Mouro et al. |
| 4,286,476 A | | 9/1981 | Stiff |
| 4,832,658 A | * | 5/1989 | Hendershot et al. .......... 74/395 |
| 5,197,264 A | | 3/1993 | Lacey |
| 6,014,907 A | | 1/2000 | Rilbe |
| 6,019,578 A | | 2/2000 | Hager et al. |
| 6,122,984 A | * | 9/2000 | Willmot ...................... 74/395 |
| 2001/0036880 A1 | * | 11/2001 | Baker, Jr. .................... 475/331 |

\* cited by examiner

Primary Examiner—Douglas C. Butler
(74) Attorney, Agent, or Firm—Phelps Dunbar, L.L.P.

(57) ABSTRACT

The angular motion translator is a device with direct mechanical coupling which allows a user to reliably and durably change the angular relationship between two elements in a rotating frame (i.e. two output shafts) by changing the angular relationship between two elements in a static reference frame, whereby the change in the angular relationship of the elements in the rotating frame is proportional to the change in the angular relationship of the elements in the static reference frame. Essentially, the angular motion translator is comprised of two linked identical planetary gear sets facing one another as mirror images. Matching elements in the two planetary gear sets are held static, although one of the static elements may be rotated with respect to the other, matching elements are rigidly attached together so that they rotate as a single unit, and the remaining matching elements are attached to either the input shaft and the inner output shaft or the outer output shaft respectively.

23 Claims, 10 Drawing Sheets

ANGULAR MOTION TRANSLATOR

This application claims the benefit of U.S. Provisional Application No. 60/186,692, filed Mar. 3, 2000.

BACKGROUND OF THE INVENTION

This invention relates generally to controlling the relative angular relationship between two elements in a rotating system by changing the relationship between two elements in a related non-rotating system, such that the relative angular relationship between the two elements in the rotating system may easily be altered while the system rotates. More specifically, the present invention provides the ability to either incrementally or continuously alter the angular relationship between two parallel output shafts by introducing a specified angular motion change (angular displacement). Essentially, the two output shafts will, when left alone, rotate together at the same speed, but with the present invention, a user may introduce an angular motion change while the shafts continue to rotate, advancing one shaft's angular position with respect to the other shaft, using a control mechanism in a static reference frame; once the user stops introducing an angular motion change, the two shafts will again rotate together at the same speed, although the angular displacement introduced will remain. In the prior art, there were two techniques for accomplishing this goal: 1) inducing lateral motion in a shaft at the center of rotation of the system, with said motion parallel and congruent to the center of rotation, and then translating that motion into the rotating system using a rotating disk sliding through bearings on levers fixed to the rotating system, or 2) varying the pressure in a hydraulic system, with said hydraulic system translated into the rotating system through a rotating seal, such that the pressure is then utilized to move an element or elements in the rotating system.

There are, however, problems inherent in these previous techniques which limit their effectiveness. Specifically, devices which use these techniques have inherently high wear factors and/or are subject to high manufacturing and maintenance costs because of the close tolerances required and the high stresses placed upon the individual components of the devices. Additionally, as these devices wear, they tend to become more unstable. The rotating disk used in the first technique described above must be able to handle all of the torque induced through the system. Because of the high relative motion of the disk to the rotating system, the rate of wear will be high and, with wear, the system will tend to oscillate. And, the hydraulic-based systems described above are inherently unstable since they do not consist of a direct mechanical coupling. Minute variations in any part of the system will impact the pressure within the hydraulic fluid and will alter the position of the driven elements, with this altering of position then changing the pressure in the hydraulic fluid to initiate positive feedback and cause, or perpetuate, an oscillation.

The present invention overcomes these problems because it employs a direct mechanical coupling which allows for control of the relative angular position of two elements in the rotating system, while such control is induced in or between two static elements outside of the rotating system. Since the present invention uses gears (with meshing teeth) for a direct mechanical coupling, the forces are spread effectively throughout the device, reducing both wear and oscillation concerns.

SUMMARY OF THE INVENTION

The Angular Motion Translator ("AMT") consists conceptually of two inertial frames: a static reference frame, which is static relative to the observer, and a rotating frame, which rotates about an axis with respect to the static reference frame and the observer. The AMT can be used to translate an angular relationship between two elements contained within the static reference frame into a proportional angular relationship between two elements contained within the rotating frame. More specifically, an angular (rotational) displacement of one of the elements in the static reference frame with respect to the other element in the static reference frame will result in a proportional angular (rotational) displacement of one of the elements in the rotating frame with respect to the other element in the rotating frame, allowing a user of the AMT to easily alter the angular relationship between the two elements in the rotating frame.

The physical embodiments of the AMT are comprised of two linked, identical planetary gear sets. Each planetary gear set is comprised of a sun gear, a planetary gear array (further comprised of one or more planet gears and a planetary carrier which links the planet gears together and which fixes their orbit around the sun gear and the central axis of the planetary gear set), and an annular gear. In such planetary gear sets, the sun gear is located at the center (on the central axis of the planetary gear set), the planet gears rotate around the outside of the sun gear in orbit (with the teeth of each planet gear meshing with the teeth of the sun gear, forming a mechanical coupling), the planetary carrier links the axis of rotation of each of the planet gears and holds the planet gears together in orbit about the sun gear (such that the planetary gear array rotates as a unit), and the annular gear encompasses the whole (with the teeth of the planet gears meshing with the teeth of the annular gear, forming a mechanical coupling).

In the AMT, the two identical planetary gear sets face one another as mirror images. One of the elements of the first planetary gear set is held static, and the identical, matching element in the second planetary gear set is also held static, although the angular relationship between them may be changed. These two elements are in the static reference frame. A different element of the first planetary gear set is rigidly attached to the input shaft, with the input shaft passing through the entire AMT along the center axis (passing through the second planetary gear set without interacting with the second planetary gear set) and emerging as the inner output shaft, and the identical, matching element in the second planetary gear set is rigidly attached to the outer output shaft, which is hollow so that it does not interact with the inner output shaft. The inner output shaft and the outer output shaft are the two elements in the rotating frame. Finally, the remaining elements in both of the planetary gear sets are rigidly linked together so that they rotate as one unit. In this configuration, a change in the angular relationship between the two elements in the static reference frame produces a proportional change in the angular relationship between the two elements in the rotating frame.

So in static mode, when the input shaft rotates to provide driving power, both the inner output shaft (which is essentially a continuation of the input shaft) and the outer output shaft will rotate at the same angular speed (i.e. there will be no angular displacement). If, however, one of the elements which is being held static is rotated with respect to the other element which is being held static in the other planetary gear set, this introduces an angular displacement (either adding or subtracting a proportion of the amount of rotation between the two static elements in the static reference frame to the input rotation, resulting in a change to the outer output shaft rotation). Thus, the angular relationship between the inner output shaft and the outer output shaft may be altered proportionately by rotating one of the static elements with respect to the other.

Although the two planetary gear sets could be connected in any number of ways (so long as identical, matching elements in each planetary gear set are held static; another element in the first planetary gear set is rigidly connected to its sister, identical, matching element in the second planetary gear set; the remaining elements are connected to either the input shaft and the inner output shaft or the outer output shaft respectively; and the matching gears of each of the planetary gear sets are identical in size and number of teeth), there are two preferred embodiments which simplify construction due to convenient bearing placement. In the first embodiment, the input shaft is rigidly attached to the sun gear of the first planetary gear set, such that when the input shaft rotates, it causes the sun gear of the first planetary gear set to rotate. The sun gear of the first planetary gear set is also rigidly attached to the inner output shaft, such that the sun gear of the first planetary gear set is sandwiched between the input shaft and the inner output shaft (or, these three elements may be thought of as one, continuous element). The planet gears of the first planetary gear set orbit the sun gear with meshing teeth. The annular gear of the first planetary gear set encompasses the first planetary gear set, with its teeth meshing with those of the planet gears, and it is held static. The planetary carrier for the first planetary gear set is rigidly attached to the planetary carrier for the second planetary gear set, such that the planetary gear array (comprised of the planet gears and the planetary carrier) of the first planetary gear set and the planetary gear array (comprised of the planet gears and the planetary carrier) of the second planetary gear set are linked and rotate as a unit. The planetary gear arrays typically each have an equal number of planet gears, and the rotating axis of pairs of planet gears matched between the two planetary gear arrays are often fixed into a mounting-bearing assembly that is free to rotate about the primary axis (i.e. the planetary carriers of the first planetary gear set and the second planetary gear set are linked in such a way that they rest on bearings that allow them to freely rotate about the inner output shaft without interacting with the inner output shaft as it passes from the first planetary gear set on through the second planetary gear set). The annular gear for the second planetary gear set is also held static, with its teeth meshing with those of the planet gears of the second planetary gear set, which it encompasses. The planet gears of the second planetary gear set orbit the sun gear of the second planetary gear set, with meshing teeth. The sun gear of the second planetary gear set is rigidly attached to the outer output shaft, such that when the sun gear of the second planetary gear set rotates, it causes the outer output shaft to rotate. The outer output shaft is hollow, and the sun gear of the second planetary gear set also has a hollow center so that the inner output shaft, which is rigidly attached to the sun gear of the first planetary gear set, may pass through the center of the second planetary gear set without interacting with it, emerging from the second planetary gear set as the inner output shaft, within (and parallel with, along the centerline) the outer output shaft.

In this embodiment, when both annular gears are held static, both output shafts rotate at the same angular velocity, moving in unison. The rotation of the input shaft, which is the same as the rotation of the inner output shaft since they are both rigidly connected to the sun gear of the first planetary gear set, is transmitted through the AMT via the sun gear in the first planetary gear set, which drives the planet gears of the first planetary gear set to rotate in orbit around the sun gear of the first planetary gear set and within the annular gear of the first planetary gear set, thereby driving the planetary carrier (and the planetary gear array as a whole) of the first planetary gear set. The planetary carrier (and the planetary gear array) of the first planetary gear set then drives the planetary gear array of the second planetary gear set, since the planetary carrier of the first planetary gear set is rigidly attached to the planetary carrier of the second planetary gear set (such that the planet gears of the second planetary gear set rotate in unison with the planet gears of the first planetary gear set), causing the sun gear of the second planetary gear set, and thereby the outer output shaft, to rotate.

Since all of the gears in both of the planetary gear sets are identical (matching with their sister in the other planetary gear set), when the annular gears are held fixed, the input rotation from the input shaft is transferred through the AMT without any change so that the inner output shaft and the outer output shaft rotate at the same angular speed, and there is no angular displacement between the two output shafts. But, if the annular gear of the second planetary gear set is rotated with respect to the annular gear of the first planetary gear set (or vice versa), then the outer output shaft will receive a proportional rotation (angular displacement) with respect to the inner output shaft. Once the angular relationship between the two annular gears has ceased to change, the two output shafts will again rotate at the same angular speed, but their angular relationship will have changed proportionally to the change in the angular relationship between the two annular gears (i.e. the angular displacement would remain). The angular change in relationship between the two output shafts is equal to the angular change in relationship between the two annular gears times a scaling factor, which is the number of teeth in an annular gear divided by the number of teeth in a planet gear.

In the second preferred embodiment, the input shaft is rigidly attached to the sun gear of the first planetary gear set, such that when the input shaft rotates, it causes the sun gear of the first planetary gear set to rotate. The sun gear of the first planetary gear set is also rigidly attached to the inner output shaft, such that the sun gear of the first planetary gear set is sandwiched between the input shaft and the inner output shaft (or, these three elements may be thought of as one, continuous element). The planet gears of the first planetary gear set are held in place around the sun gear (with meshing teeth) by the planetary carrier of the first planetary gear set, which is held static (while typically resting on bearings such that it does not interact with the input shaft). The annular gear of the first planetary gear set encompasses the planet gears (with meshing teeth) and is rigidly attached to the annular gear of the second planetary gear set, which encompasses the second planetary gear set. Thus, the annular gears of both planetary gear sets are linked and rotate as a single unit. The planet gears of the second planetary gear set are held in place within the annular gear of the second planetary gear set by the planetary carrier of the second planetary gear set, which is statically fixed (while typically resting on bearings such that it does not interact with the outer output shaft), except that the angular relationship between the two planetary carriers may be altered. The planet gears of the second planetary gear set surround the sun gear of the second planetary gears set (with meshing teeth), which is located at the center of the second planetary gear set. The sun gear of the second planetary gear set is hollow, such that the inner output shaft may pass through the second planetary gear set without interacting with it, and is rigidly attached to the outer output shaft, which is also hollow.

In this embodiment, when both planetary carriers are held static, both output shafts rotate at the same angular velocity, moving in unison. The rotation of the input shaft, which is the same as the rotation of the inner output shaft since they are both rigidly connected to the sun gear of the first planetary gear set, is transmitted via the sun gear, through the planet gears of the first planetary gear set, to the annular gear of the first planetary gear set. The planet gears do not orbit the sun gear because they are restrained by the static planetary carrier, so that the planet gears instead rotate in place, transmitting the driving force to the annular gear and causing the annular gear to rotate. Since the annular gear of the first planetary gear set is rigidly attached to the annular gear of the second planetary gear set, the annular gear of the second planetary gear set is driven in lockstep with the annular gear of the first planetary gear set. The annular gear of the second planetary gear set acts upon the planet gears of the second planetary set, which are restrained by the static planetary carrier of the second planetary gear set so that they do not traverse the annular gear or orbit the sun gear, causing the planet gears of the second planetary gear set to rotate in place and thereby driving the sun gear of the second planetary gear set. The sun gear of the second planetary gear set drives the outer output shaft.

Since all of the gears in both of the planetary gear sets are identical (matching with their sister in the other planetary gear set), when the two planetary carriers are held fixed, the input rotation from the input shaft is transferred through the AMT without any change so that the inner output shaft and the outer output shaft rotate at the same angular speed and there is no angular displacement between the two output shafts. But, if the planetary carrier for the second planetary gear set is rotated with respect to the planetary carrier of the first planetary gear set (or vice versa), then the outer output shaft will receive a proportional rotation (angular displacement) with respect to the inner output shaft. Once the angular relationship between the two planetary carriers has ceased to change, the two output shafts will again rotate at the same angular speed, but their angular relationship will have changed proportionally to the change in the angular relationship between the two planetary carriers (i.e. the angular displacement would remain). The angular change in relationship between the two output shafts is equal to the angular change in relationship between the two planetary carriers times a scaling factor, which is the number of teeth in a planet gear divided by the number of teeth in an annular gear. This embodiment provides a greater mechanical advantage for the change inducing force than in the first embodiment, since a planet gear will always have fewer teeth than an annular gear.

The primary object of this invention is to allow a user to alter the angular relationship between two elements in a rotational frame. It is still another object to allow a user to alter the angular relationship between two elements in a rotating frame proportionately to a change in the relationship between two elements in a static reference frame. It is yet another object of this invention to employ direct mechanical coupling. It is yet another object to provide a durable, low-maintenance device for altering the angular relationship between two rotational elements, reducing wear and oscillation concerns. In addition to these general objects, the AMT can be used in several real-world applications. For example, an AMT device could be used for dispensing filament for a weed trimmer, for controlling the amplitude of shaking in a chute-type feeder for dry product, for operating a shutter in a motion picture camera, or for measuring torque. The use of the AMT to perform these various functions will be described in greater detail in the detailed description section below. These are only illustrative examples of possible uses for the AMT and are not exclusive; the AMT is not limited to these uses. These and other objects of the present invention will be more apparent to those skilled in the art field from the following detailed description of the AMT invention.

BRIEF DESCRIPTION OF THE DRAWINGS

Reference will be made to the drawings wherein like parts are designated by like numerals and wherein:

FIG. 7 is a sectional view and

FIG. 10 is a sectional view and

DETAILED DESCRIPTION OF THE PREFERRED EMBODIMENTS

Figure 1:
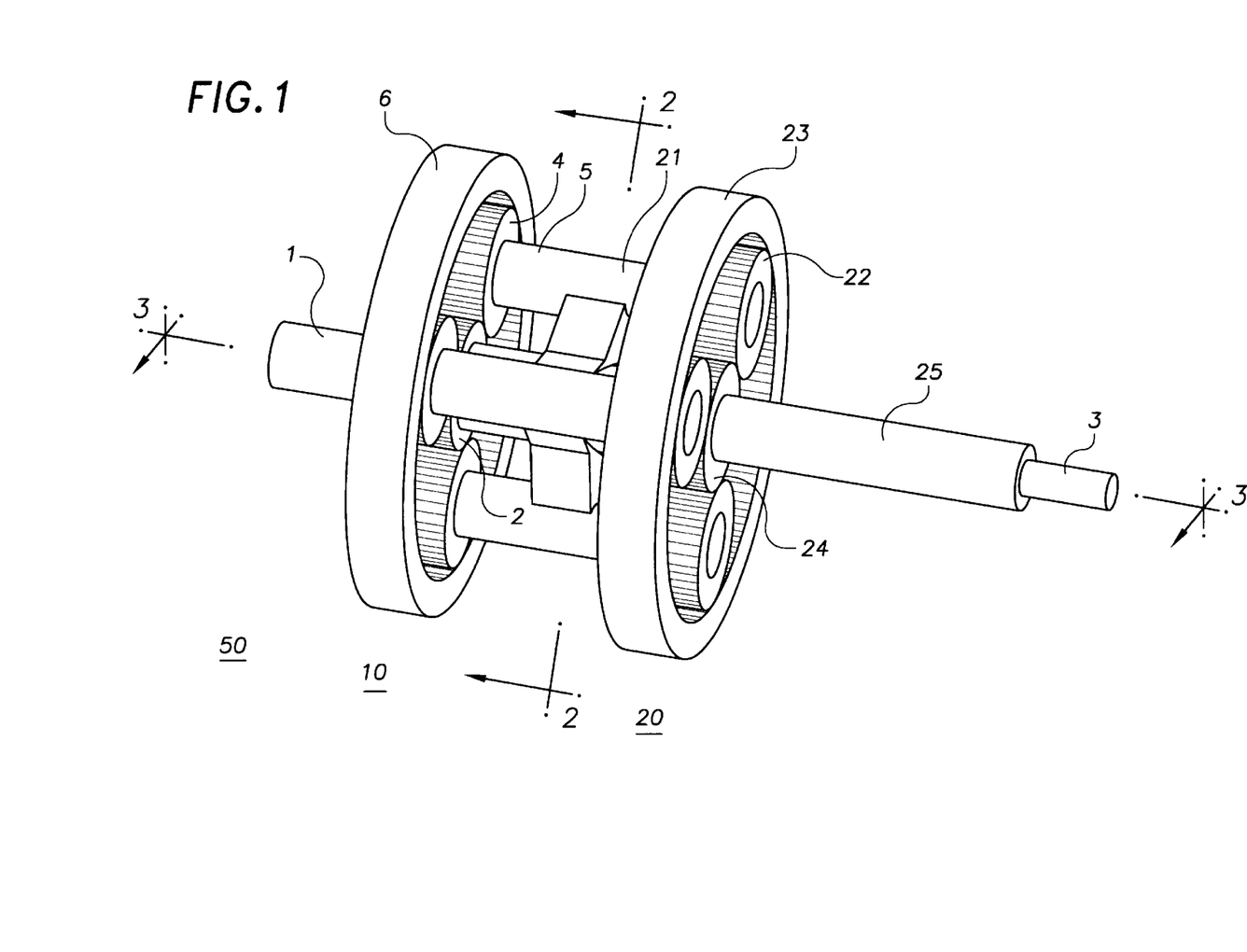
FIG. 1 is an isometric view of the first preferred embodiment of the Angular Motion Translator, wherein the annular gears are the static elements and the planetary carriers, and thereby the planetary arrays, are linked.
Figure 2:
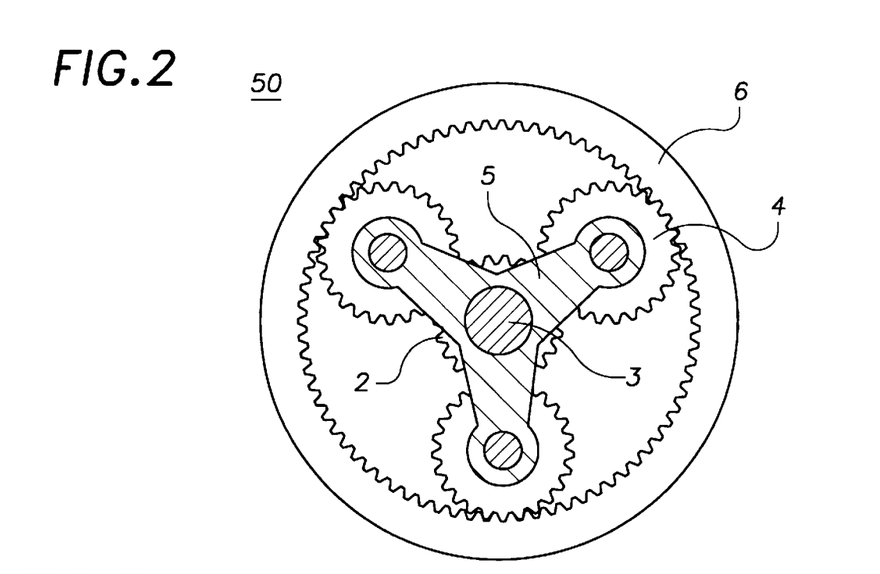
FIG. 2 is a longitudinal section of the first preferred embodiment of the AMT.
Figure 3:
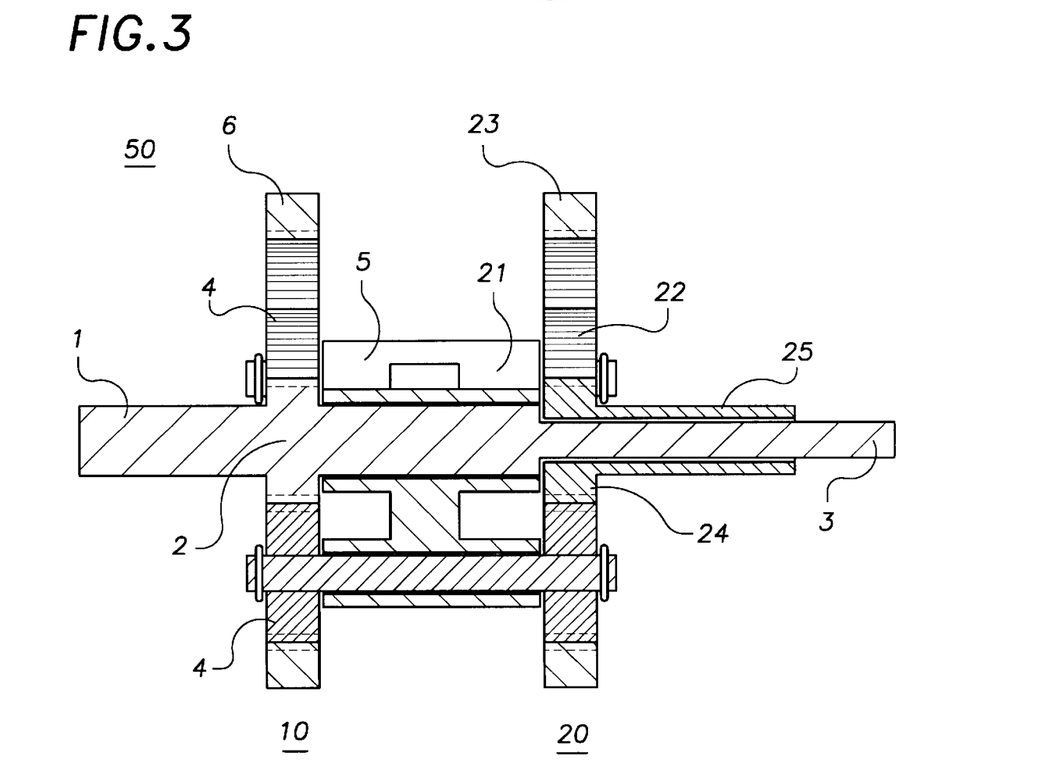
FIG. 3 is a traverse section of the first preferred embodiment of the AMT.

Referring now to the drawings in more detail, the preferred embodiments of the Angular Motion Translator ("AMT") 50 are set forth below. The first preferred embodiment is shown in FIGS. 1, 2, and 3. In the first preferred embodiment, the AMT 50 is comprised of two planetary gear sets 10 and 20, with the first planetary gear set 10 comprised of a sun gear 2, a planetary gear array (further comprised of planet gears 4 and a planetary carrier 5, although not separately numbered in the drawings), and an annular gear 6; and with the second planetary gear set comprised of a sun gear 24, a planetary gear array (further comprised of planet gears 22 and a planetary carrier 21, although not separately numbered in the drawings), and an annular gear 23. The input shaft 1 is rigidly attached to the sun gear 2 of the first planetary gear set 10, such that when the input shaft 1 rotates, it causes the sun gear 2 of the first planetary gear set 10 to rotate. The sun gear 2 of the first planetary gear set 10 is also rigidly attached to the inner output shaft 3, such that the sun gear 2 of the first planetary gear set 10 is sandwiched between the input shaft 1 and the inner output shaft 3 (or, these three elements may be thought of as one, continuous element). The planet gears 4 of the first planetary gear set 10 orbit the sun gear 2 with meshing teeth. The annular gear 6 of the first planetary gear set 10 encompasses the first planetary gear set 10, with its teeth meshing with those of the planet gears 4, and annular gear 6 is held static. The planetary carrier 5 for the first planetary gear set 10 is rigidly attached to the planetary carrier 21 for the second planetary gear set 20, such that the planetary gear array of the first planetary gear set 10 and the planetary gear array of the second planetary gear set 20 are linked and rotate as a unit. The planetary gear arrays (comprised of planet gears 4 or 22 in conjunction with the respective planetary carrier 5 or 21, and not separately numbered in the drawings) each typically have an equal number of planet gears 4 and 22, and the rotating axis of pairs of planet gears 4 and 22 matched between the two planetary gear arrays are often fixed into a mounting-bearing assembly that is free to rotate about the primary axis (i.e. the planetary carrier 5 of the first planetary gear set 10 and the planetary carrier 21 of the second planetary gear set 20 are linked in such a way that they on bearings that allow them to freely rotate about the inner output shaft 3 without interacting with the inner output shaft 3 as it passes from the first planetary gear set 10 on through the second planetary gear set 20). The annular gear 23 of the second planetary gear set 20 is also held static, except that the angular relationship between the two annular gears 6 and 23 may be altered. The planet gears 22 of the second planetary gear set 20 traverse the annular gear 23 of the second planetary gear set 20 and orbit the sun gear 24 of the second planetary gear set 20, with meshing teeth. The sun gear 24 of the second planetary gear set 20 is rigidly attached to the outer output shaft 25, such that when the sun gear 24 of the second planetary gear set 20 rotates, the outer output shaft 25 also rotates. The outer output shaft 25 is hollow, and the sun gear 24 of the second planetary gear set 20 also has a hollow center so that the inner output shaft 3, which is rigidly attached to the sun gear 2 of the first planetary gear set 10, may pass through the center of the second planetary gear set 20 without interacting with the second planetary gear set 20, emerging from the second planetary gear set 20 as the inner output shaft 3, within (and parallel with, along the centerline) the outer output shaft 25.

In this embodiment, when both annular gears 6 and 23 are held static, both the inner output shaft 3 and the outer output shaft 25 rotate at the same angular velocity, moving in unison. The rotation of the input shaft 1, which is the same as the rotation of the inner output shaft 3 since they are both rigidly connected to the sun gear 2 of the first planetary gear set 10, is transmitted through the AMT 50 via the sun gear 2 in the first planetary gear set 10, which drives the planet gears 4 of the first planetary gear set 10 to rotate in orbit around the sun gear 2 of the first planetary gear set 10 and within the annular gear 6 of the first planetary gear set 10, thereby driving the planetary carrier 5 (and the planetary gear array as a whole) of the first planetary gear set 10. The planetary carrier 5 of the first planetary gear set 10 is rigidly attached to the planetary carrier 21 of the second planetary gear set 20, so that the planetary carrier 21 of the second planetary gear set 20 is driven in unison with the planetary carrier 5 of the first planetary gear set 10. The planetary carrier 21 (and the planetary gear array) of the second planetary gear set 20 then drives the planet gears 22 of the second planetary gear set 20 (in unison with the rotation of the planet gears 4 of the first planetary gear set 10), causing the sun gear 24 of the second planetary gear set 20, and thereby the outer output shaft 25, to rotate.

Since all of the gears in both of the planetary gear sets 10 and 20 are identical (matching with their sister in the other planetary gear set), when the annular gears 6 and 23 are held fixed, the input rotation from the input shaft 1 is transferred through the AMT 50 without any change so that the inner output shaft 3 and the outer output shaft 25 rotate at the same angular speed and there is no angular displacement between the two output shafts 3 and 25. But, if the annular gear 23 for the second planetary gear set 20 is rotated with respect to the annular gear 6 of the first planetary gear set 10 (or vice versa), then the outer output shaft 25 will receive a proportional rotation (angular displacement) with respect to the inner output shaft 3. Once the angular relationship between the two annular gears 6 and 23 has ceased to change, the two output shafts 3 and 25 will again rotate at the same angular speed, but their angular relationship will have changed proportionally to the change in the angular relationship between the two annular gears 6 and 23 (i.e. the angular displacement would remain). The angular change in relationship between the two output shafts 3 and 25 is equal to the angular change in relationship between the two annular gears 6 and 23 times a scaling factor, which is the number of teeth in an annular gear (either 6 or 23) divided by the number of teeth in a planet gear (either 4 or 22).

Figure 4:
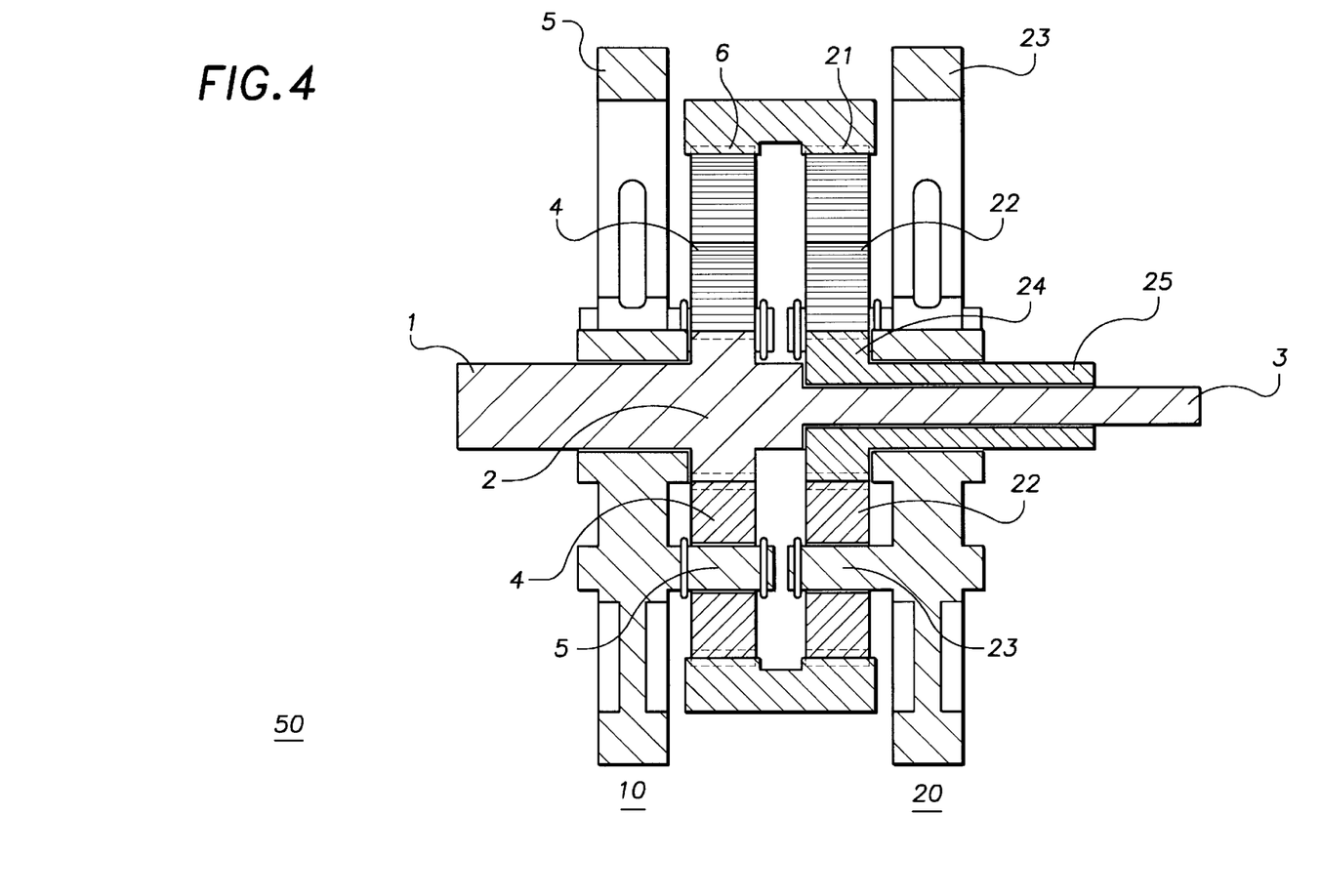
FIG. 4 is a cross-section of the second preferred embodiment of the Angular Motion Translator, wherein the planetary carriers are the static elements and the annular gears are linked.

The second preferred embodiment of the Angular Motion Translator 50 is shown in FIG. 4. In the second preferred embodiment, the input shaft 1 is rigidly attached to the sun gear 2 of the first planetary gear set 10, such that when the input shaft 1 rotates, it causes the sun gear 2 of the first planetary gear set 10 to rotate. The sun gear 2 of the first planetary gear set 10 is also rigidly attached to the inner output shaft 3, such that the sun gear 2 of the first planetary gear set 10 is sandwiched between the input shaft 1 and the inner output shaft 3 (or, these three elements may be thought of as one, continuous element). The planet gears 4 of the first planetary gear set 10 are held in place around the sun gear 2 (with meshing teeth) by the planetary carrier 5 of the first planetary gear set 10. The planetary carrier 5 of the first planetary gear set 10 is held static. The annular gear 6 of the first planetary gear set 10 encompasses the planet gears 4 (with meshing teeth) and is rigidly attached to the annular gear 21 of the second planetary gear set 20, which encompasses the second planetary gear set 20. Thus, the annular gears 6 and 21 for both planetary gear sets 10 and 20 are linked and rotate in lockstep as a single unit. The planet gears 22 of the second planetary gear set 20 are held in place within the annular gear 21 of the second planetary gear set 20 by the planetary carrier 23 of the second planetary gear set 20. The planetary carrier 23 of the second planetary gear set 20 is statically fixed, except that the angular relationship between the two planetary carriers 5 and 23 may be altered. The planet gears 22 of the second planetary gear set 20 surround the sun gear 24 of the second planetary gears set 20 (with meshing teeth), which is located at the center of the second planetary gear set 20. The sun gear 24 of the second planetary gear set 20 is hollow, such that the inner output shaft 3 may pass through the second planetary gear set 20 without interacting with the second planetary gear set 20, and is rigidly attached to the outer output shaft 25, which is also hollow.

In this embodiment, when both planetary carriers 5 and 23 are held static, both the inner output shaft 3 and the outer output shaft 25 rotate at the same angular velocity, moving in unison. The rotation of the input shaft 1, which is the same as the rotation of the inner output shaft 3 since they are both rigidly connected to the sun gear 2 of the first planetary gear set 10, is transmitted via the sun gear 2, through the planet gears 4 of the first planetary gear set 10, to the annular gear 6 of the first planetary gear set 10. The planet gears 4 do not orbit the sun gear 2 because they are restrained by the static planetary carrier 5, so that the planet gears 4 instead rotate in place, transmitting the driving force to the annular gear 6 and causing the annular gear 6 to rotate. Since the annular gear 6 of the first planetary gear set 10 is rigidly attached to the annular gear 21 of the second planetary gear set 20, the annular gear 21 of the second planetary gear set 20 is driven in lockstep with the annular gear 6 of the first planetary gear set 10. The annular gear 21 of the second planetary gear set 20 acts upon the planet gears 22 of the second planetary set 20, which are restrained by the static planetary carrier 23 so that they do not traverse the annular gear 21 or orbit the sun gear 24 of the second planetary gear set 20, causing the planet gears 22 of the second planetary gear set 20 to rotate in place and thereby driving the sun gear 24 of the second planetary gear set 20. The sun gear 24 of the second planetary gear set 20 drives the outer output shaft 25.

Since all of the gears in both of the planetary gear sets 10 and 20 are identical (matching with their sister in the other planetary gear set), when the two planetary carriers 5 and 23 are held fixed, the input rotation from the input shaft 1 is transferred through the AMT 50 without any change so that the inner output shaft 3 and the outer output shaft 25 rotate at the same angular speed and there is no angular displacement between the two output shafts 3 and 25. But, if the planetary carrier 23 for the second planetary gear set 20 is rotated with respect to the planetary carrier 5 of the first planetary gear set 10 (or vice versa), then the outer output shaft 25 will receive a proportional rotation (angular displacement) with respect to the inner output shaft 3. Once the angular relationship between the two planetary carriers 5 and 23 has ceased to change, the two output shafts 3 and 25 will again rotate at the same angular speed, but their angular relationship will have changed proportionally to the change in the angular relationship between the two planetary carriers 5 and 23 (i.e. the angular displacement would remain). The angular change in relationship between the two output shafts 3 and 25 is equal to the angular change in relationship between the two planetary carriers 5 and 23 times a scaling factor, which is the number of teeth in a planet gear (either 4 or 22) divided by the number of teeth in an annular gear (either 6 or 21). This embodiment provides a greater mechanical advantage for the change inducing force than in the first embodiment, since a planet gear (4 or 22) will always have fewer teeth than an annular gear (6 or 21).

Figure 5:
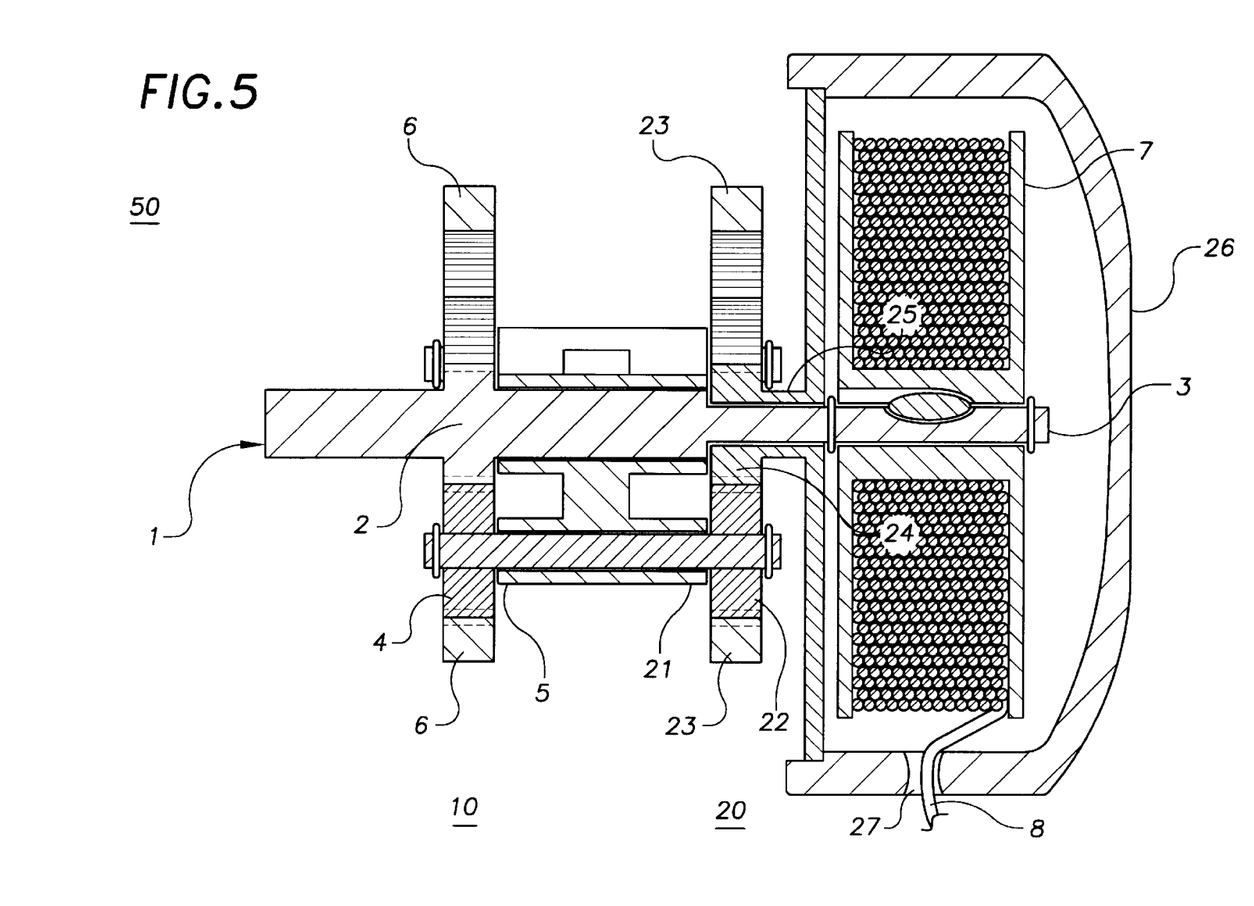
FIG. 5 is a cross-section of the AMT configured to dispense filament, as for a weed trimmer.

These preferred embodiments of the AMT 50 may be put to various uses. FIG. 5 demonstrates an AMT 50 configured as in the first preferred embodiment as described above (although other embodiments could also be used) to act as a mechanism for continuously feeding filament 8 from a spool 7 out of a cover 26, as for a weed trimmer. The driving power from the weed trimmer motor enters the AMT 50 as the input shaft 1. A filament dispensing spool 7 is rigidly attached to the inner output shaft 3, such that when said inner output shaft 3 rotates, the spool 7 also rotates with it. A length of filament 8 is wrapped around the spool 7. A cover 26 encompasses the spool 7 without contacting the spool 7 and is rigidly attached to the outer output shaft 25, such that when said outer output shaft 25 rotates, the cover 26 also rotates with it. The cover 26 has a feeding aperture 27, through which the free end of the filament 8 wrapped around the spool 7 is fed. The portion of filament 8 outside of the cover 26 is used as the cutting instrument for the weed trimmer. The annular gear 23 of the second planetary gear set 20 is fixed to the chassis of the trimmer, while the annular gear 6 of the first planetary gear set 10 may be controlled by the user to rotate the inner output shaft 3 with respect to the outer output shaft 25. The filament 8 is advanced through the aperture 27 in the cover 26 when the user causes rotation of the annular gear 6 of the first planetary gear set 10 with respect to the fixed annular gear 23 of the second planetary gear set 20, since this causes the spool 7 to rotate with respect to the cover 26.

Figure 6:
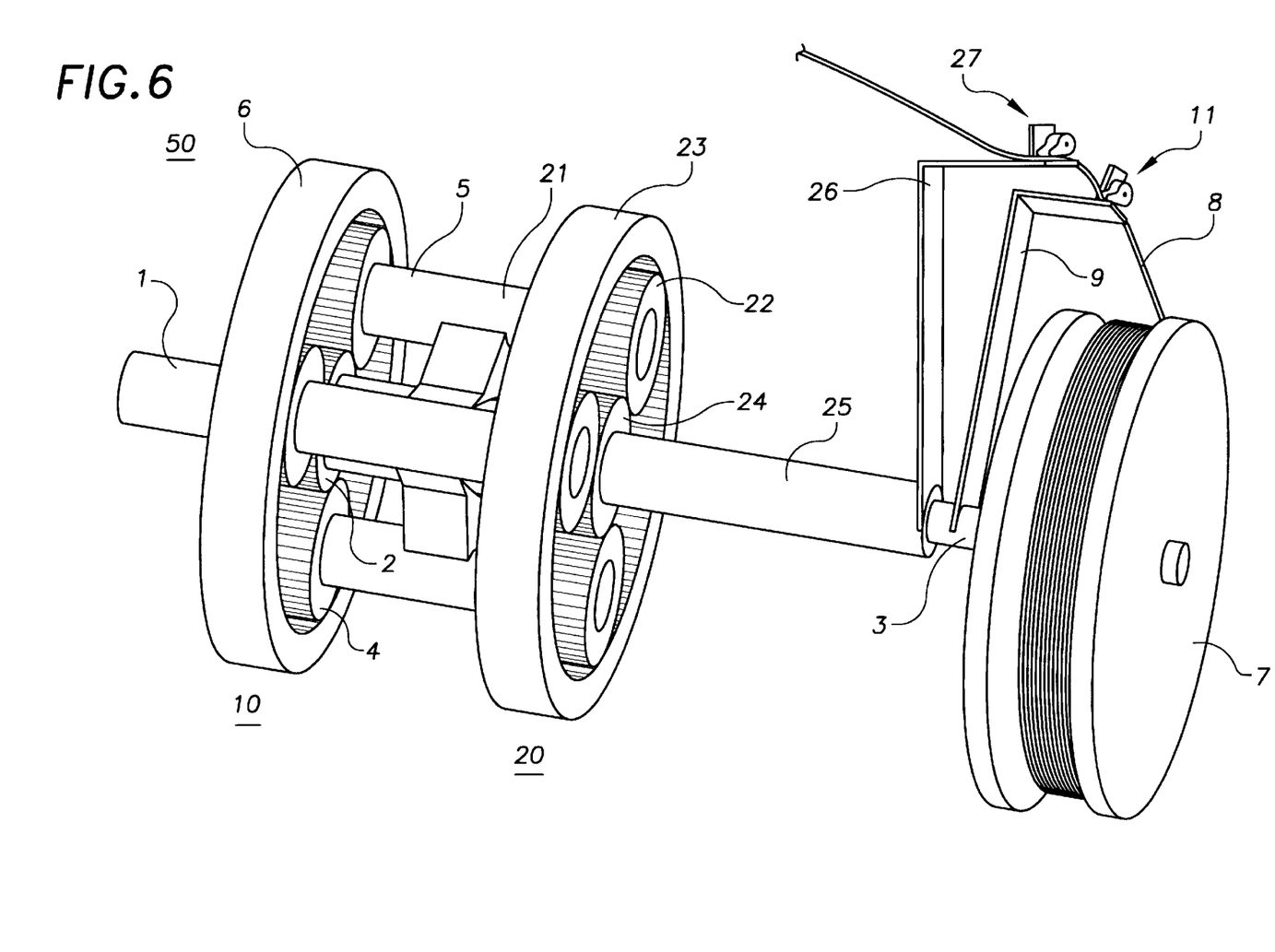
FIG. 6 is an isometric view of the AMT configured to incrementally dispense filament, as for a weed trimmer.

FIG. 6 demonstrates an AMT 50 configured as in the first preferred embodiment described above (although other embodiments could also be used) to act as a mechanism for incrementally feeding filament 8 from a spool 7, as for a weed trimmer. The driving power from the weed trimmer motor enters the AMT 50 as the input shaft 1. A spool 7 is free to rotate about the inner output shaft 3. A length of filament 8 is wrapped around the spool 7. A first feed arm 9 is rigidly attached to the inner output shaft 3, such that when the inner output shaft 3 rotates, the first feed arm 9 rotates with it. Located on the first feed arm 9 is a one directional tension pincer 11, which grips the filament 8 when moved in one direction, but releases the filament 8 when moved in the opposite direction. A second feed arm 26 is rigidly attached to the outer output shaft 25, such that when the outer output shaft 25 rotates, the second feed arm 26 rotates with it. Located on the second feed arm 26 is a one directional tension pincer 27, which grips the filament 8 when moved in one direction, but releases the filament 8 when moved in the opposite direction. The free end of the filament 8 leaves the spool 7, passes through the one directional tension pincer 11 on the first feed arm 9, passes through the one directional tension pincer 27 on the second feed arm 26, and extends out to act as the cutting element for the weed trimmer.

The annular gear 6 of the first planetary gears set 10 is fixed to the chassis of the weed trimmer. The annular gear 23 of the second planetary gears set 20 is spring loaded against a stop. The user may alter the angle between the annular gear 6 of the first planetary gear set 10 and the annular gear 23 of the second planetary gear set 20 by a specific amount, using a cable or lever mechanism for example, to rotate the annular gear 23 of the second planetary gear set 20 a specific amount. Then, upon release, the annular gear 23 of the second planetary gear set 20 will return against its stop. When the user imparts such a change in the angular relationship between annular gear 6 of the first planetary gears set 10 and annular gear 23 of the second planetary gear set 20, this is translated into relative motion of the two feed arms 9 and 26, which will draw a specific, incremental amount of filament 8 from spool 7, using both one directional tension pincers 11 and 27, before resetting to their original angular relationship.

Figure 7:
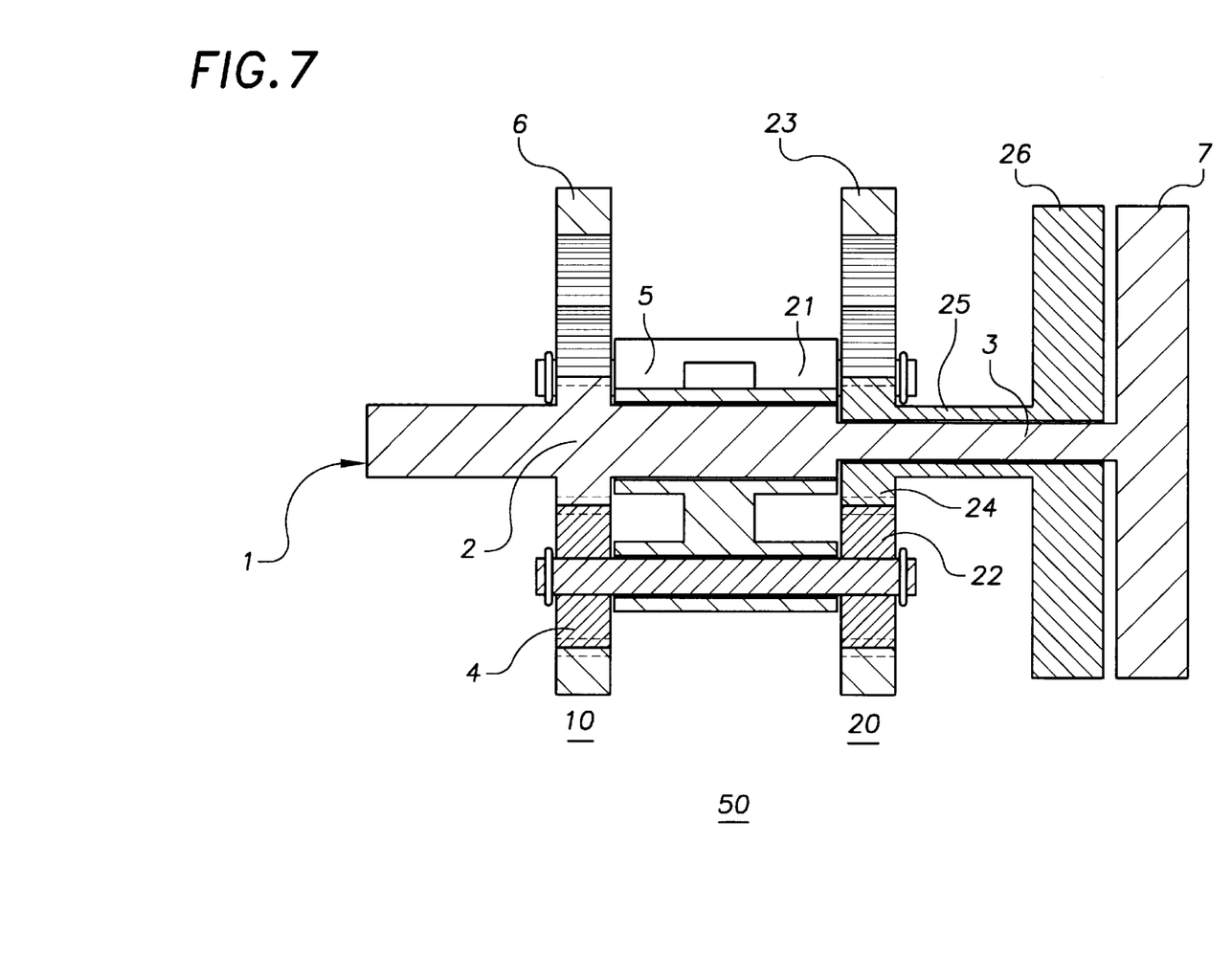
Figure 8:
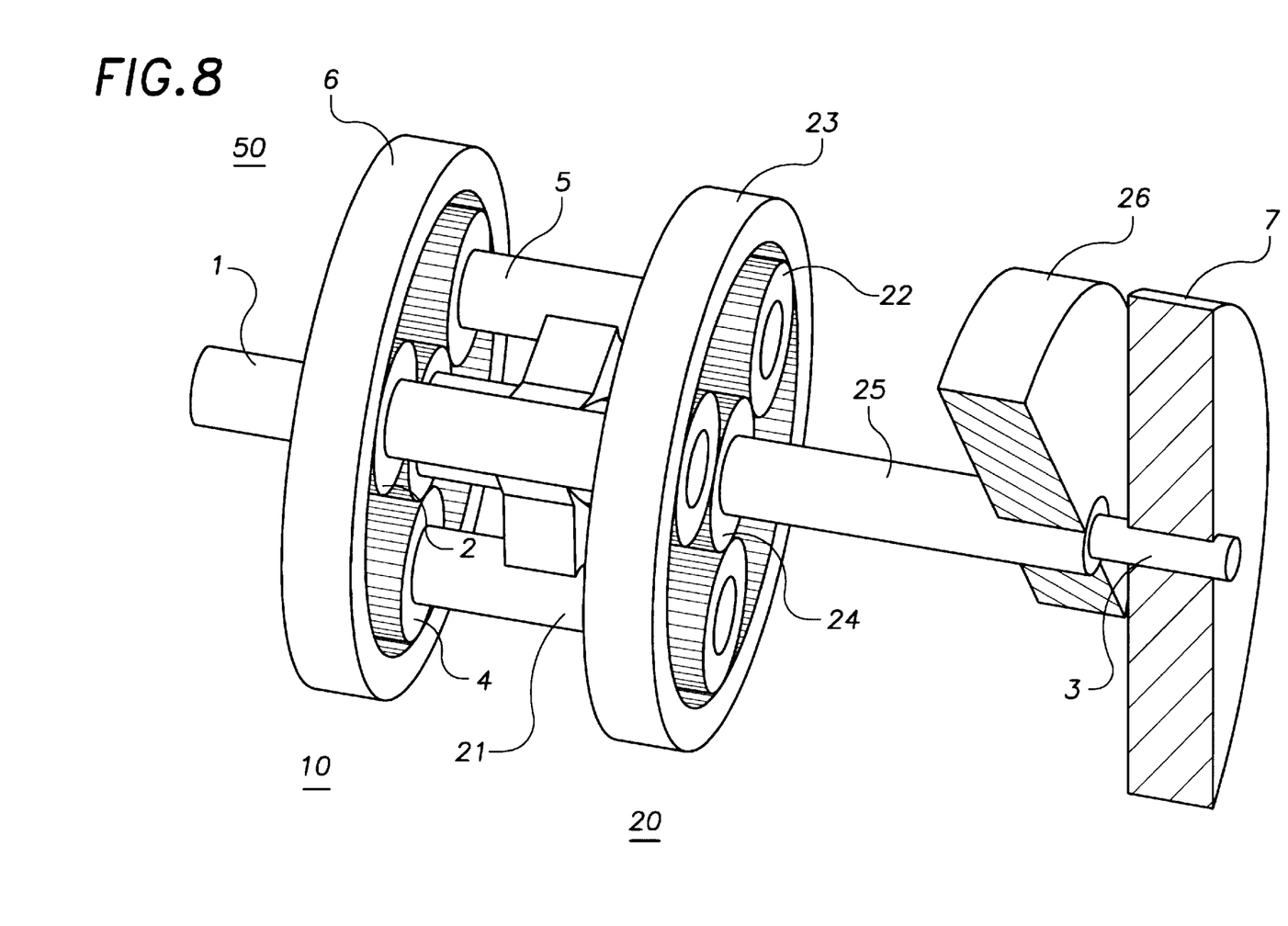
FIG. 8 is an isometric view of an AMT configured for controlling the amplitude of an eccentrically shaped shaker system in a shaking chute-type feeding system for dry product.

FIGS. 7 and 8 demonstrate an AMT 50 configured as in the first preferred embodiment described above (although other embodiments could also be used) to act as an adjustable eccentric shaker in a chute-type feeding system for dry product. The power from the shaker motor enters the AMT 50 through the input shaft 1. A first eccentrically-shaped mass 7 is rigidly attached to the inner output shaft 3. A second eccentrically-shaped mass 26 is rigidly attached to the outer output shaft 25. In the preferred embodiment, each of the eccentrically-shaped masses 7 and 26 are semi-circular in shape and are equally weighted. Thus, when the two eccentrically-shaped masses 7 and 26 are exactly 180 degrees opposed, the system would be in balance, with minimum vibration; when the two eccentrically-shaped masses 7 and 26 are exactly in phase, the system would have maximum eccentricity and would produce maximum vibration. The annular gear 23 of the second planetary gear set 20 is fixed to the driving motor's frame. The annular gear 6 for the first planetary gear set 10 may be rotated by the user to control the amplitude of the vibration of the shaker feed chute, while maintaining a constant frequency. In operation, when the annular gear 6 is static, the power from the input shaft would cause both the inner output shaft 3 and the outer output shaft 25, and thereby both of the eccentrically-shaped masses 7 and 26, to rotate at the same angular speed. The shaker chute is a separate unit (not shown in the drawing) located above and contacting both of the eccentrically-shaped masses 7 and 26. Thus, the AMT 50 will cause the shaker chute to vibrate due to the rotation of the two eccentrically-shaped masses 7 and 26, with the amount of vibration depending upon the relationship between the two eccentrically-shaped masses 7 and 26. A user may adjust the relative angular relationship of the two eccentrically-shaped masses 7 and 26, and thereby alter the amount of vibration imparted to the chute, by rotating the annular gear 6 of the first planetary gear set 10. Thus, the AMT 50 may be used to adjust the amount of eccentricity in a shaker chute system, thereby adjusting the amplitude of vibration of the shaker chute.

Figure 9:
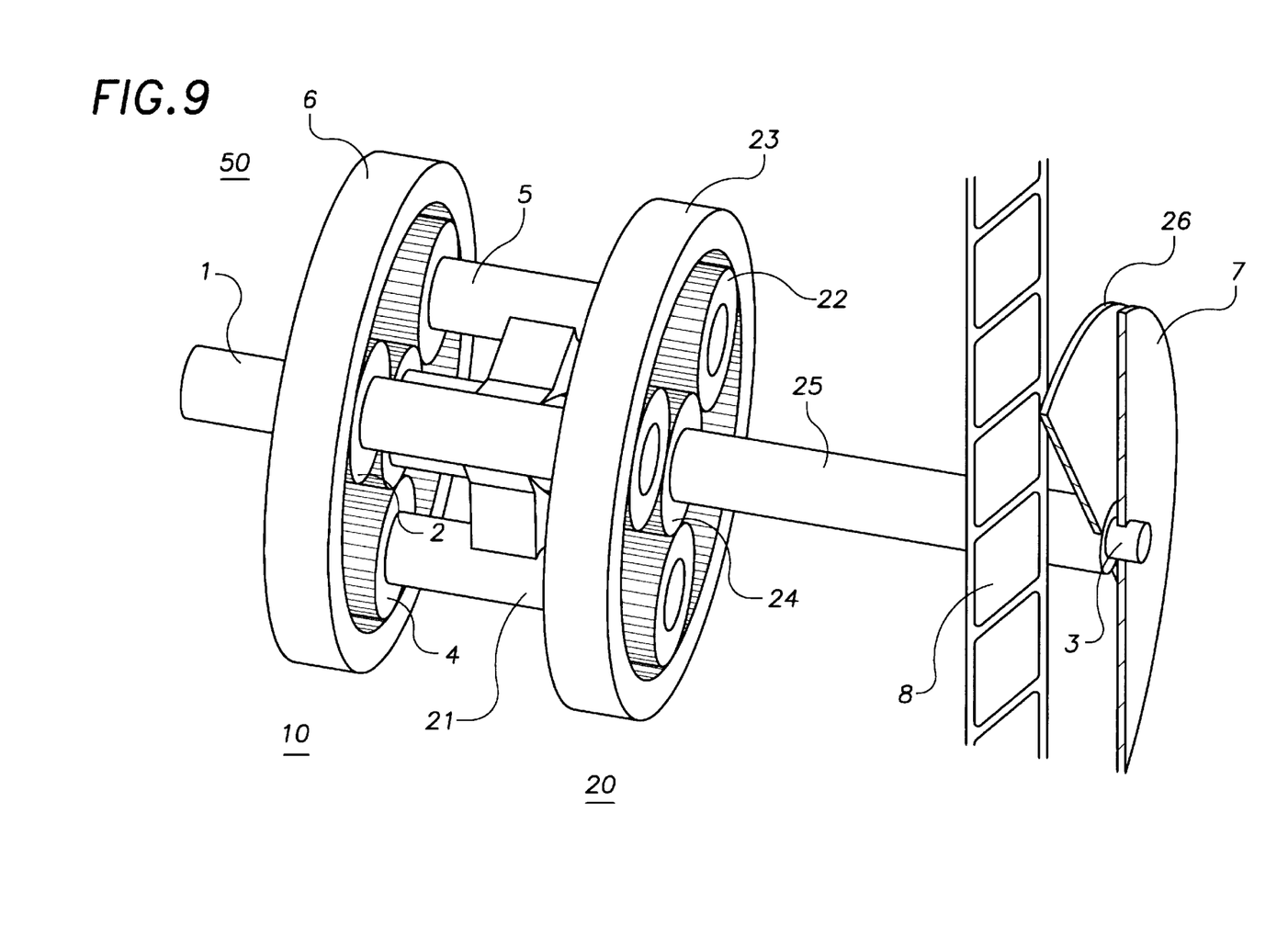
FIG. 9 is an isometric view of an AMT configured as a motion picture camera shutter control system.

FIG. 9 demonstrates an AMT 50 configured as in the first preferred embodiment described above (although other embodiments could also be used) to act as a dynamically adjustable shutter for a motion picture camera. Both the annular gear 6 of the first planetary gear set 10 and the annular gear 23 of the second planetary gear set 20 are normally held static relative to the camera frame. A shutter element 7, which is semi-circular in the preferred embodiment, is rigidly attached to the inner output shaft 3. A shutter element 26, which is semi-circular in the preferred embodiment, is rigidly attached to the outer output shaft 25. The film 8 passes behind the shutter elements 7 and 26. In normal operation, with both annular gears 6 and 23 held static, the shutter elements 7 and 26 rotate at a constant speed, and each frame of the film 8 is advanced incrementally during the "closed" portion of the shutter cycle, when the shutter elements 7 and 26 hide the film 8. The duration of the "closed" portion of the shutter cycle depends upon the relative position of the two shutter elements 7 and 26. If shutter element 7 and shutter element 26 are in phase, then the "closed" period will be short (i.e. it will be half of the time for full rotation of the inner output shaft 3 or the outer output shaft 25); the more out of phase the shutter elements 7 and 26 are, the longer the "closed" period will be. A user may dynamically alter the amount of exposure for the film 8 by changing the angular relationship between the annular gears 6 and 23, thereby altering the angular relationship between the shutter elements 7 and 26 to provide for more or less exposure, depending upon whether the shutter elements 7 and 26 are in phase or out of phase with each other.

In addition to the AMT 50 allowing a user to alter the angular relationship of two rotating elements when two identical, matching elements in the first planetary gear set 10 and the second planetary gear set 20 are held static, the AMT has other possible uses if one of the static elements is released. If either of the static elements is released, that element will be free to rotate, and the majority of the energy in the input shaft 1 will be delivered to that free element causing it to rotate. Consequently, either of the fixed static elements could also be used as a clutch, allowing for the engagement or release of the output shafts 3 and 25.

Figure 10:
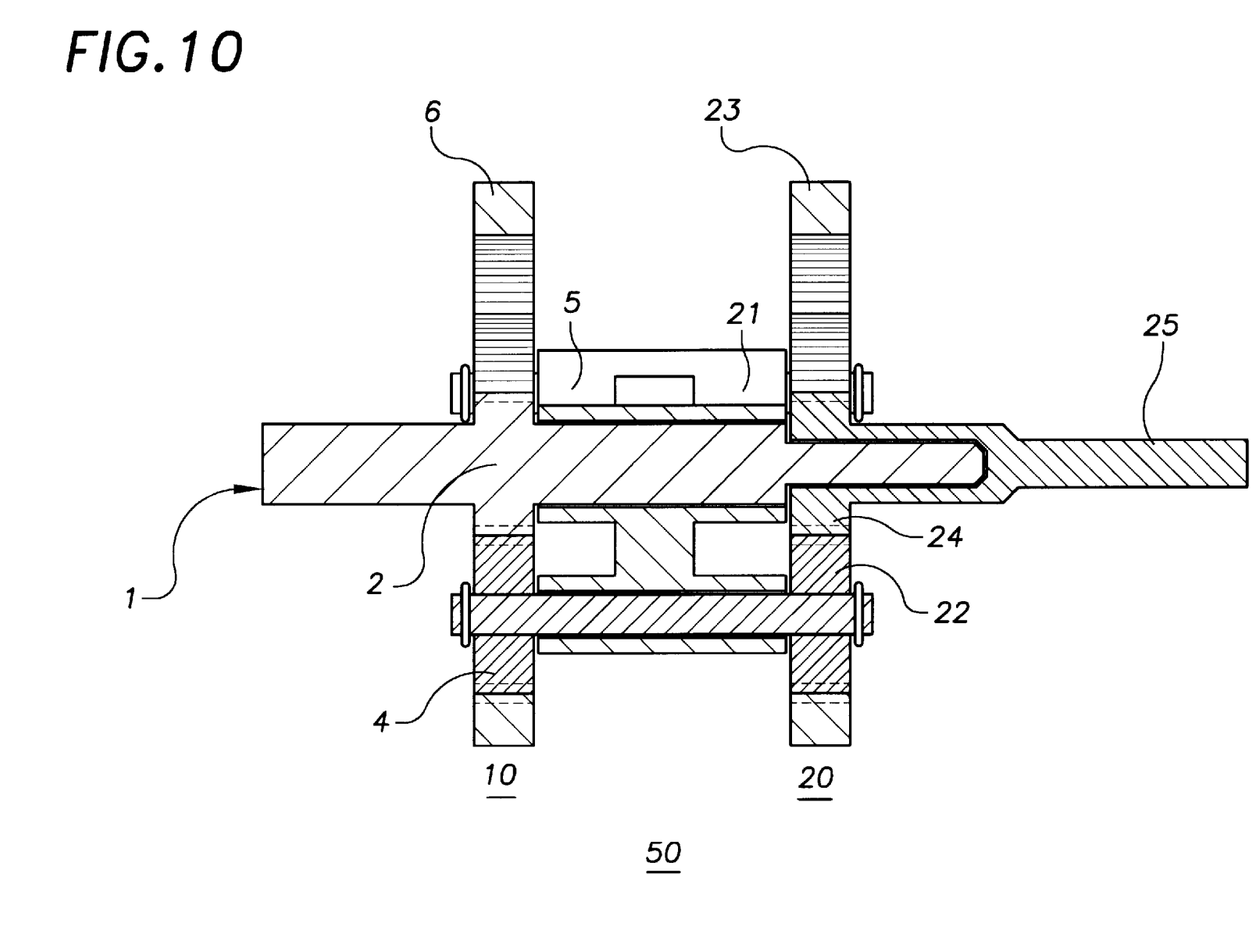
Figure 11:
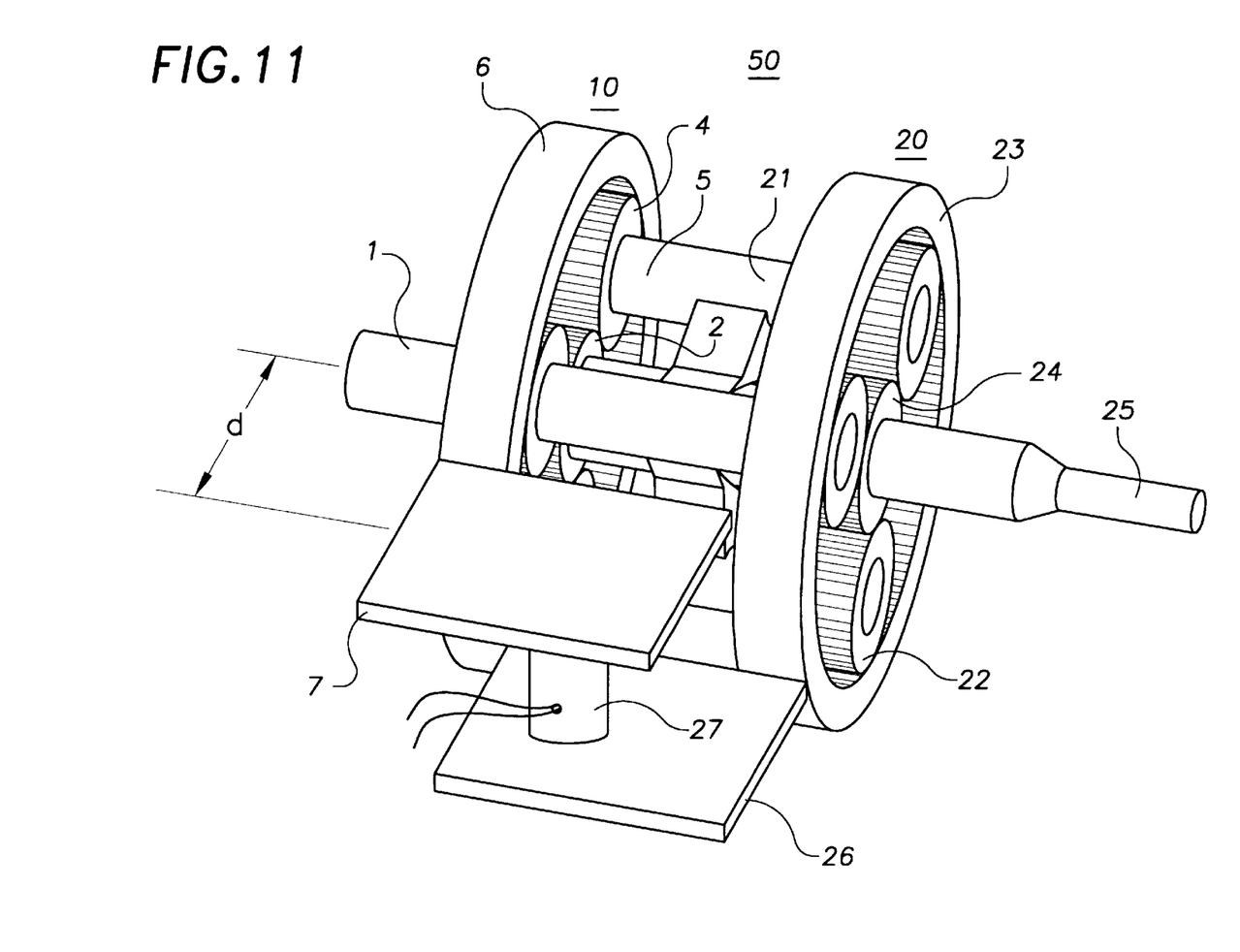
FIG. 11 is an isometric view of the AMT configured as a torque measuring system.

It also follows from this characteristic that a torque must be present in each of the fixed elements that is equal to but opposite in rotation to the torque being delivered through the output shafts. By taking advantage of this fact, the AMT 50 (in any of it various embodiments, including all of the versions described above) may be used as a torque measuring device. FIGS. 10 and 11 demonstrate the preferred embodiment of the AMT 50 which is configured as in the first general preferred embodiment described above (although other embodiments could also be used) to act exclusively as a torque measurement device. For this type of configuration, only a single output shaft is required. Thus, in the preferred embodiment, the input shaft 1 is rigidly connected to the sun gear 2 of the first planetary gear set 10. The planet gears 4 surround the sun gear 2, are held in place (with their axis linked together) by planetary carrier 5, and are encompassed by annular gear 6 of the first planetary gear set 10. Planetary carrier 5 of the first planetary gear set 10 is rigidly attached to planetary carrier 21 of the second planetary gear set 20, such that they rotate as a single unit, driving the planet gears 22 of the second planetary gear set 20. The planet gears 22 surround sun gear 24 of the second planetary gear set 20 and are encompassed by the annular gear 23 of the second planetary gear set 20. The sun gear 24 of the second planetary gear set 20 is rigidly attached to the output shaft 25. The annular gear 6 of the first planetary gear set 10 is anchored, such that it is fixed static, and a first platform 7, which is a flat plate in the preferred embodiment extending out from the annular gear 6 of the first planetary gear set 10 towards but not contacting annular gear 23 of the second planetary gear set 20, is rigidly attached to the outer surface of the annular gear 6 parallel to the center axis of the AMT 50. A second platform 26 is rigidly attached to the outer surface of the annular gear 23 of the second planetary gear set 20 parallel to the center axis of the AMT 50 and, in the preferred embodiment, extends back from the second planetary gear set 20 towards but not contacting the annular gear 6 of the first planetary gear set 10. Located between the first platform 7 and the second platform 26 is a force meter 27.

So, in operation, the torque to be measured is applied to the output shaft 25. This produces an equal and opposite torque on the annular gear 23 of the second planetary set 20, which in turn produces a force on the force meter 27. This force may be measured by reading the force meter 27. A user may determine the torque being applied to the output shaft 25 by multiplying the distance (d) of the force meter from the center axis of the AMT 50 (and the center axis of the output shaft 25) times the measured force detected by the force meter 27. This allows precise torque measurement without any movement of the measuring element.

The uses listed above are only exemplary, and are not intended to limit the scope of the present invention in any way. And, even though the preferred embodiments listed above describe only one configuration of the AMT 50, it is to be understood that other variants of the AMT 50 will function effectively. These and other uses of the AMT 50 will be understood by persons skilled in the art field.

What I claim is:

1. An angular motion translator comprised of:
    an input shaft;
    an inner output shaft;
    an outer output shaft;
    a first planetary gear set comprised of three elements; and
    a second planetary gear set comprised of three elements;
        wherein:
        said second planetary gear set is identical to said first planetary gear set, such that said elements of said second planetary gear set match said elements of said first planetary gear set;
        one of said elements of said first planetary gear set is rigidly attached to said input shaft and to said inner output shaft, and said matching element of said second planetary gear set is rigidly attached to said outer output shaft;

another of said elements of said first planetary gear set is rigidly attached to said matching element of said second planetary gear set; and remaining of said elements of said first planetary gear set and said second planetary gear set are held static.

2. An angular motion translator as in claim 1 wherein one of said elements held static is rotatable with respect to the other of said elements held static; and wherein a rotation between said elements held static produces a proportional rotation between said inner output shaft and said outer output shaft.

3. An angular motion translator as in claim 2 wherein:

said three elements of said first planetary gear set are comprised of a sun gear, a planetary gear array, and an annular gear; and said three elements of said second planetary gear set are comprised of a sun gear, a planetary gear array, and an annular gear.

4. An angular motion translator as in claim 3 wherein said sun gear of said second planetary gear set and said outer output shaft are hollow, such that said inner output shaft passes through said sun gear of said second planetary gear set and said outer output shaft without directly interacting with said sun gear of said second planetary gear set or said outer output shaft.

5. An angular motion translator as in claim 6 wherein:

said input shaft is rigidly attached to said sun gear of said first planetary gear set;

said inner output shaft is rigidly attached to said sun gear of said first planetary gear set;

said planetary gear array of said first planetary gear set is rigidly attached to said planetary gear array of said second planetary gear set;

said annular gear of said first planetary gear set and said annular gear of said second planetary gear set are held static; and said sun gear of said second planetary gear set is rigidly attached to said outer output shaft.

6. An angular motion translator as in claim 4 wherein:

said input shaft is rigidly attached to said sun gear of said first planetary gear set;

said inner output shaft is rigidly attached to said sun gear of said first planetary gear set;

said annular gear of said first planetary gear set is rigidly attached to said annular gear of said second planetary gear set;

said planetary gear array of said first planetary gear set and said planetary gear array of said second planetary gear set are held static; and said outer output shaft is rigidly attached to said sun gear of said second planetary gear set.

7. An angular motion translator as in claim 2 further comprising a spool, a length of filament, and a cover wherein:

said filament is wound around said spool;

said cover further comprises an aperture;

said spool is rigidly attached to said inner output shaft;

said cover is rigidly attached to said outer output shaft; and said filament extends out from said spool though said aperture of said cover.

8. An angular motion translator as in claim 7 wherein said filament may be advanced by altering the angular relationship of said elements held static, thereby altering the angular relationship between said spool and said cover.

9. An angular motion translator as in claim 2 further comprising a spool, a length of filament, a first feed arm, and a second feed arm, wherein:

said filament is wound around said spool;

said first feed arm further comprises a one directional tension pincer;

said second feed arm further comprises a one directional tension pincer;

said spool is free to rotate about said inner output shaft;

said first feed arm is rigidly attached to said inner output shaft;

said second feed arm is rigidly attached to said outer output shaft; and said filament extends out from said spool, through said one directional tension pincer of said first feed arm, and through said one directional tension pincer of said second feed arm.

10. An angular motion translator as in claim 9 wherein said filament may be incrementally advanced by altering the angular relationship of said elements held static, thereby altering the angular relationship between said first feed arm and said second feed arm.

11. An angular motion translator as in claim 2 further comprising a first eccentrically-shaped mass and a second eccentrically-shaped mass, wherein:

said first eccentrically-shaped mass is rigidly attached to said inner output shaft, and said second eccentrically-shaped mass is rigidly attached to said outer output shaft.

12. An angular motion translator as in claim 11 wherein the amount of eccentricity may be adjusted by altering the angular relationship between said elements held static, thereby altering the angular relationship between said first eccentrically-shaped mass and said second eccentrically-shaped mass.

13. An angular motion translator as in claim 2 further comprising a first shutter element and a second shutter element, wherein said first shutter element is rigidly attached to said inner output shaft and said second shutter element is rigidly attached to said outer output shaft.

14. An angular motion translator as in claim 13 wherein the amount of exposure of film may be adjusted by altering the angular relationship between said elements held static, thereby altering the angular relationship between said first shutter element and said second shutter element.

15. An angular motion translator as in claim 2 further comprising a first platform, a second platform, and a means for measuring the amount of force, wherein:

said first platform is rigidly attached to one of said elements held static;

said second platform is rigidly attached to the other of said elements held static; and said means for measuring force is placed in between and in contact with said first platform and said second platform.

16. An angular motion translator as in claim 15 wherein the amount of torque applied to said outer output shaft may be measured by reading the force between said first platform and said second platform from said means for measuring force and multiplying said force times the radial distance of said means for measuring force from the centerline of said outer output shaft.

17. An angular motion translator comprised of:

an in put shaft;

an inner output shaft;

an outer output shaft;

a first planetary gear set comprised of three elements; and a second planetary gear set comprised of three elements; wherein:

said second planetary gear set is identical to said first planetary gear set, such that said elements of said second planetary gear set match said elements of said first planetary gear set;

one of said elements of said first planetary gear set is rigidly attached to said input shaft and to said inner output shaft, and said matching element of said second planetary gear set is rigidly attached to said outer output shaft;

another of said elements of said first planetary gear set is rigidly attached to said matching element of said second planetary gear set;

remaining of said elements of said first planetary gear set and said second planetary gear set are held static;

one of said elements held static is rotatable with respect to the other of said elements held static; and wherein a rotation between said elements held static produces a proportional rotation between said inner output shaft and said outer output shaft;

said three elements of said first planetary gear set are further comprised of a sun gear, a planetary gear array, and an annular gear, and said three elements of said second planetary gear set are further comprised of a sun gear, a planetary gear array, and an annular gear; and said sun gear of said second planetary gear set and said outer output shaft are hollow, such that said inner output shaft passes through said sun gear of said second planetary gear set and said outer output shaft without directly interacting with said sun gear of said second planetary gear set or said outer output shaft.

18. An angular motion translator as in claim 17 wherein:

said input shaft is rigidly attached to said sun gear of said first planetary gear set;

said inner output shaft is rigidly attached to said sun gear of said first planetary gear set;

said planetary gear array of said first planetary gear set is rigidly attached to said planetary gear array of said second planetary gear set;

said annular gear of said first planetary gear set and said annular gear of said second planetary gear set are held static; and said sun gear of said second planetary gear set is rigidly attached to said outer output shaft.

19. An angular motion translator as in claim 18 further comprising a spool, a length of filament, and a cover wherein:

said filament is wound around said spool;

said cover further comprises an aperture;

said spool is rigidly attached to said inner output shaft;

said cover is rigidly attached to said outer output shaft;

said filament extends out from said spool though said aperture of said cover; and said filament may be continuously advanced by altering the angular relationship of said annular gear of said first planetary gear set with respect to said annular gear of said second planetary gear set, thereby altering the angular relationship between said spool and said cover.

20. An angular motion translator as in claim 18 further comprising a spool, a length of filament, a first feed arm, a second feed arm, a spring, and a stop wherein:

said filament is wound around said spool;

said first feed arm further comprises a one directional tension pincer;

said second feed arm further comprises a one directional tension pincer;

said annular gear of said second planetary gear set is spring loaded against said stop;

said spool is free to rotate about said inner output shaft;

said first feed arm is rigidly attached to said inner output shaft;

said second feed arm is rigidly attached to said outer output shaft;

said filament extends out from said spool, through said one directional tension pincer of said first feed arm, and through said one directional tension pincer of said second feed arm; and said filament may be incrementally advanced by altering the angular relationship of said annular gear of said second planetary gear set with respect to said annular gear of said first planetary gear set, thereby altering the angular relationship between said first feed arm and said second feed arm.

21. An angular motion translator as in claim 17 wherein:

said input shaft is rigidly attached to said sun gear of said first planetary gear set;

said inner output shaft is rigidly attached to said sun gear of said first planetary gear set;

said annular gear of said first planetary gear set is rigidly attached to said annular gear of said second planetary gear set;

said planetary gear array of said first planetary gear set and said planetary gear array of said second planetary gear set are held static; and said outer output shaft is rigidly attached to said sun gear of said second planetary gear set.

22. An angular motion translator as in claim 21 further comprising a spool, a length of filament, and a cover wherein:

said filament is wound around said spool;

said cover further comprises an aperture;

said spool is rigidly attached to said inner output shaft;

said cover is rigidly attached to said outer output shaft;

said filament extends out from said spool though said aperture of said cover; and said filament may be continuously advanced by altering the angular relationship of said planetary gear array of said first planetary gear set with respect to said planetary gear array of said second planetary gear set, thereby altering the angular relationship between said spool and said cover.

23. An angular motion translator as in claim 21 further comprising a spool, a length of filament, a first feed arm, a second feed arm, a spring, and a stop wherein:

said filament is wound around said spool;

said first feed arm further comprises a one directional tension pincer;

said second feed arm further comprises a one directional tension pincer;

said planetary gear array of said second planetary gear set is spring loaded against said stop;

said spool is free to rotate about said inner output shaft;

said first feed arm is rigidly attached to said inner output shaft;

said second feed arm is rigidly attached to said outer output shaft;

said filament extends out from said spool, through said one directional tension pincer of said first feed arm, and through said one directional tension pincer of said second feed arm; and said filament may be incrementally advanced by altering the angular relationship of said planetary gear array of said second planetary gear set with respect to said planetary gear array of said first planetary gear set, thereby altering the angular relationship between said first feed arm and said second feed arm.

* * * * *